(12) United States Patent
Miriyala et al.

(10) Patent No.: US 12,021,740 B2
(45) Date of Patent: Jun. 25, 2024

(54) POLICY ENFORCEMENT FOR BARE METAL SERVERS BY TOP OF RACK SWITCHES

(71) Applicant: Juniper Networks, Inc., Sunnyvale, CA (US)

(72) Inventors: Prasad Miriyala, San Jose, CA (US); Wen Lin, Andover, MA (US); Suresh Palguna Krishnan, Fremont, CA (US); SelvaKumar Sivaraj, Sunnyvale, CA (US); Kumuthini Ratnasingham, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 86 days.

(21) Appl. No.: 17/305,117

(22) Filed: Jun. 30, 2021

(65) Prior Publication Data

US 2022/0385570 A1    Dec. 1, 2022

Related U.S. Application Data

(60) Provisional application No. 63/194,724, filed on May 28, 2021.

(51) Int. Cl.
*G06F 15/16* (2006.01)
*H04L 12/46* (2006.01)
(Continued)

(52) U.S. Cl.
CPC .......... *H04L 45/34* (2013.01); *H04L 12/4641* (2013.01); *H04L 45/566* (2013.01); *H04L 45/586* (2013.01); *H04L 45/74* (2013.01)

(58) Field of Classification Search
CPC ..... H04L 45/74; H04L 45/586; H04L 45/566; H04L 12/4641; H04L 45/34
(Continued)

(56) References Cited

U.S. PATENT DOCUMENTS 6,292,900 B1    9/2001    Ngo et al.
7,327,757 B2    2/2008    Ghahremani et al.
(Continued)

FOREIGN PATENT DOCUMENTS

CN    1514601 A    7/2004
CN    103414631 A    11/2013
(Continued)

OTHER PUBLICATIONS

Underlay and overlay networks: The approach to solve addressing and segmentation problems in the new networking era: VXLAN encapsulation with Cisco and open source networks Edison F. Naranjo; Gustavo D. Salazar Ch 2017 IEEE Second Ecuador Technical Chapters Meeting (ETCM) Year: 2017 | Conference Paper (Year: 2017).*

(Continued)

*Primary Examiner* — Oscar A Louie
*Assistant Examiner* — Oluwatosin M Gidado
(74) *Attorney, Agent, or Firm* — Shumaker & Sieffert, P.A.

(57) ABSTRACT

A plurality of switches may be arranged according to a spine and leaf topology in which each spine switch is connected to all leaf switches. A leaf switch includes a memory configured to store a plurality of policies, each of the plurality of policies being associated with a respective source identifier value and a respective destination address; a network interface communicatively coupled to one of the spine switches; and a processor implemented in circuitry and configured to: receive a packet from the spine switch via the network interface, the packet being encapsulated with a Virtual Extensible Local Area Network (VXLAN) header; extract a source identifier value from the VXLAN header; determine a destination address for the packet; determine a policy of the plurality of policies to apply to the packet according to (Continued)

the source identifier value and the destination address; and apply the policy to the packet.

15 Claims, 7 Drawing Sheets

(51) Int. Cl.
    *H04L 45/00*     (2022.01)
    *H04L 45/586*     (2022.01)
    *H04L 45/74*     (2022.01)

(58) Field of Classification Search
    USPC .......................................................... 709/238
    See application file for complete search history.

(56) References Cited

U.S. PATENT DOCUMENTS

| | | | |
|---|---|---|---|
| 7,516,475 | B1 | 4/2009 | Chen et al. |
| 7,546,629 | B2 | 6/2009 | Albert et al. |
| 7,860,006 | B1 | 12/2010 | Kashyap et al. |
| 8,099,774 | B2 | 1/2012 | Abzarian et al. |
| 8,301,746 | B2 | 10/2012 | Head et al. |
| 9,282,164 | B2 | 3/2016 | Finn et al. |
| 9,680,875 | B2 | 6/2017 | Knjazihhin et al. |
| 9,865,685 | B2 | 1/2018 | Sim et al. |
| 10,116,732 | B1 | 10/2018 | Canto et al. |
| 10,122,629 | B2 | 11/2018 | Lentczner et al. |
| 10,250,529 | B2 | 4/2019 | Maier et al. |
| 10,728,288 | B2 | 7/2020 | Miriyala |
| 10,742,557 | B1 | 8/2020 | Miriyala et al. |
| 10,742,690 | B2 | 8/2020 | Miriyala et al. |
| 11,128,490 | B2 | 9/2021 | Motwani et al. |
| 11,336,515 | B1* | 5/2022 | Mehta ...................... H04L 69/22 |
| 11,469,998 | B2 | 10/2022 | Sanghvi et al. |
| 2005/0180398 | A1 | 8/2005 | Deno et al. |
| 2006/0022816 | A1 | 2/2006 | Yukawa |
| 2006/0075198 | A1 | 4/2006 | Susaki et al. |
| 2007/0169186 | A1 | 7/2007 | Ueoka et al. |
| 2009/0070268 | A1 | 3/2009 | Sarkissian et al. |
| 2011/0055367 | A1 | 3/2011 | Dollar |
| 2012/0005724 | A1 | 1/2012 | Lee |
| 2013/0182722 | A1 | 7/2013 | Vishveswaraiah et al. |
| 2013/0329731 | A1 | 12/2013 | Gabriel et al. |
| 2014/0033268 | A1 | 1/2014 | Julisch et al. |
| 2014/0245423 | A1 | 8/2014 | Lee |
| 2015/0063353 | A1 | 3/2015 | Kapadia et al. |
| 2015/0081893 | A1 | 3/2015 | Chadwell et al. |
| 2015/0124809 | A1 | 5/2015 | Edsall et al. |
| 2015/0149631 | A1* | 5/2015 | Lissack ............... H04L 41/5051 709/226 |
| 2015/0195137 | A1 | 7/2015 | Kashyap et al. |
| 2016/0055354 | A1 | 2/2016 | Jinaraj et al. |
| 2016/0142306 | A1* | 5/2016 | Shimokuni ........... H04L 45/021 709/238 |
| 2016/0261486 | A1 | 9/2016 | Fang et al. |
| 2018/0109450 | A1 | 4/2018 | Filsfils et al. |
| 2018/0316729 | A1 | 11/2018 | Chauvet et al. |
| 2019/0014124 | A1 | 1/2019 | Reddy et al. |
| 2019/0068690 | A1 | 2/2019 | Canton et al. |
| 2019/0158541 | A1 | 5/2019 | Miriyala et al. |
| 2019/0361727 | A1 | 11/2019 | Thakkar et al. |
| 2020/0136862 | A1* | 4/2020 | Jain ...................... H04L 12/4633 |
| 2020/0358702 | A1* | 11/2020 | Agrawal ................ H04L 47/30 |
| 2021/0044445 | A1 | 2/2021 | Bottorff et al. |
| 2022/0029915 | A1* | 1/2022 | Moreno ............... H04L 12/4641 |

FOREIGN PATENT DOCUMENTS

| | | | |
|---|---|---|---|
| CN | 103763367 | A | 4/2014 |
| CN | 105978817 | A | 9/2016 |
| CN | 106487719 | A | 3/2017 |
| CN | 106685903 | A | 5/2017 |
| CN | 106797351 | A | 5/2017 |
| CN | 112350943 | A | 2/2021 |
| CN | 113746760 | A | 12/2021 |
| CN | 113811858 | A | 12/2021 |
| WO | 2013/184846 | A1 | 12/2013 |
| WO | WO-2014189709 | A1 * | 11/2014 ......... H04L 12/4633 |
| WO | WO-2015092956 | A1 * | 6/2015 ......... H04L 12/4633 |
| WO | 2017/064560 | A1 | 4/2017 |
| WO | 2017103699 | A1 | 6/2017 |

OTHER PUBLICATIONS

Dynamic On-Demand Virtual Extensible LAN Tunnels via Software-Defined Wide Area Networks Gieorgi Zakurdaev; Mohammed Ismail; Chung-Horng Lung 2022 IEEE 12th Annual Computing and Communication Workshop and Conference (CCWC) Year: 2022 | Conference Paper | Publisher: IEEE (Year: 2022).*

Sangli et al., "BGP Extended Communities Attribute" Network Working Group, RFC 4360, Feb. 2006, 12 pp.

Sajassi et al., "BGP MPLS-Based Ethernet VPN," RFC 7432, IETF, Feb. 2015, 56 pp.

Mahalingam et al., "Virtual eXtensible Local Area Network (VXLAN): A Framework for Overlaying Virtualized Layer 2 Networks over Layer 3 Networks," RFC 7348, Independent Submission, Aug. 2014, 23 pp.

Nutanix, Apr. 9, 2019, available at https://www.nutanix.com/blog/building-things-people-like (last accessed Aug. 22, 2019), 4 pp.

"3.2 Rules Headers," SNORTUsers Manual 2.9.11, Applicant points out, in accordance with MPEP 609.04(a), that the year of publication, 2008, is sufficiently earlier than the effective U.S. filing date, 2017, so that the particular month of publication is not an issue, accessed from http://manual-snort-org.s3-website-us-east-1.amazonaws.com/node29.html#SECTION00421000000000000000, 4 pp.

"ClearSky Takes Primary Storage 'to the Cloud'" A DeepStorage Technology Validation Report, DeepStorage, LLC Aug. 31, 2015, 15 pp.

"Container Orchestration Services" Mesosphere, Mar. 24, 2016, available at www.mesosphere.com > solutions > container-orchestration (last accessed Aug. 22, 2019), 7 pp.

"E-security begins with sound security policies", Symantec Corporation, Announcement Symantec, XP002265695, Jun. 14, 2001, 23 pp.

"Federation" The Kubernetes Authors, Mar. 12, 2019, available at https://kubernetes.io/docs/tasks/federation/ (last accessed Aug. 22, 2019) 7 pp.

"Firewall as a Service API 2.0," OpenStack Neutron Team, OpenStack Cloud Software, last updated Sep. 21, 2017, accessed from https://specs.openstack.org/openstack/neutron-specs/specs/newton/fwaas-api-2.0.html, 31 pp.

"Hyper-Converged Kubernetes Architecture: ROBIN—Databases, Big Data" ROBIN, May 28, 2019, available at https://robin.io/product/architecture/ (last accessed Aug. 22, 2019), 4 pp.

"Hyperconverged Kubernetes" White Paper, ROBIN, Jan. 28, 2019, available at https://robin.io/portfolio/ hyperconverged-kubernetes-whitepaper/ (last accessed Aug. 22, 2019), 15 pp.

"Introduction to LizardFS," LizardFS Handbook, accessed from https://docs.lizardfs.com/introduction.html, accessed on May 7, 2020, 4 pp.

"Juniper / Contrail-specs / fw_security_enhancements.md," GitHub, May 20, 2017, accessed from https://github.com/Juniper/contrail-specs/blob/master/fw_security_enhancements.md, 10 pp.

"LizardFS is an Open Source Distributed File System licensed under GPLv3," GitHub, LizardFS, accessed from https://github.com/lizardfs/lizardfs, accessed on May 7, 2020, 2 pp.

"LizardFS, White paper Version 3.10," accessed from https://lizardfs.com/wp-content/uploads/2017/01/LizardFS-WhitePaper-Eng-v9-3.10-web-18oct-small.pdf, Jan. 2017, 20 pp.

"LizardFS, White paper Version 3.12," accessed from https://lizardfs.com/wp-content/uploads/2018/06/whitepaper_lizard_v3.12_web.pdf, Jun. 2018, 23 pp.

"Marathon Placement Constraints" Mesosphere DC/OS Documentation, Mesosphere, Oct. 25, 2018, available at https://docs.d2iq.

(56) References Cited

OTHER PUBLICATIONS com/mesosphere/dcos/1.12/deploying-services/marathon-constraints/ (last accessed Aug. 22, 2019), 2 pp.
"Marathon Placement Constraints" Mesosphere DC/OS Documentation, Mesosphere, Oct. 25, 2018, available at https://docs.d2iq.com/mesosphere/dcos/1.12/deploying-services/marathon-constraints/ (last accessed Dec. 6, 2019), 7 pp.
"Multi-Cloud" NooBaa, Apr. 28, 2018, available at https://www.noobaa.io/multicloud (last accessed Aug. 22, 2019), 7 pp.
"Open-Source, Cloud-Native Storage for Kubernetes" Rook Authors, Jun. 27, 2017, available at https://rook.io (last accessed Aug. 22, 2019), 6 pp.
"Openly serious about storage" REX-Ray, Feb. 28, 2018, available at https://rexray.readthedocs.io/en/stable/ (last accessed Aug. 22, 2019), 5 pp.
"OpenStack Docs: Placement Usage" The OpenStack Project, Mar. 18, 2019, available at https://docs.openstack.prg/placement/latest/usage/index.html (last accessed Aug. 22, 2019), 3 pp.
"OpenStack Docs: Stein Series Release Notes" The OpenStack Project, Apr. 11, 2019, available at https://docs.openstack.org/releasenotes/placement/stein.html# (last accessed Aug. 22, 2019), 4 pp.
"OpenStack Stein—OpenStack is open source software for creating private and public clouds." The OpenStack Project, Apr. 10, 2019, available at https://www.openstack.org/software/stein/ (last accessed Aug. 22, 2019), 34 pp.
"Portworx features & pricing: Container storage, HA, security" The Portworx Platform, Dec. 5, 2018, available at https://portworx.com/products/features/ (last accessed Aug. 22, 2019), 8 pp.
"REX-Ray" REX-Ray, Apr. 23, 2018, available at https://rexray.io (last accessed Aug. 22, 2019), 12 pp.
"Run Kubernetes Everywhere" Container Orchestration, Kubernetes Management, Rancher.com (last accessed Aug. 22, 2019), May 1, 2019, 10 pp.
"Scality RING Multi-Cloud Data Storage at Petabyte Scale" Scality Ring 7.4 Data Sheet, Scality, Jun. 5, 2018, 4 pp.
"Service group and Service Object support," OpenStack Neutron Team, OpenStack Cloud Software, last updated Mar. 17, 2015, accessed from http://specs.openstack.org/openstack/neutron-specs/specs/kilo/service-group.html, 7 pp.
"Welcome to LizardFS's documentation," LizardFS Handbook, accessed from https://docs.lizardfs.com/, accessed on May 7, 2020, 3 pp.
"What is Multi Cloud?" Scaility, Dec. 2, 2017, available at https://www.scality.com/topics/what-is-multi-cloud/ (last accessed Aug. 22, 2019), 10 pp.
"What Lizard Gives You," Lizard FS, accessed from https://lizardfs.com/, accessed on May 7, 2020, 4 pp.
Bielicki, "LizardFS Documentation," accessed from https://buildmedia.readthedocs.org/media/pdf/lizardfs-docs/stable/lizardfs-docs.pdf, Jun. 15, 2018, 147 pp.
Callahan, "Introducing the Zenko Multi-Cloud Data Controller—Scality" Scality, Jul. 12, 2017, available at https://www.scality.com/introducing-zenko-multi-cloud-data-controller/ (last accessed Aug. 22, 2019), 10 pp.
Droms, R. "Dynamic Host Configuration Protocol" Network Working Group, RFC 2131, Mar. 1997, 45 pp.
Enns et al. "Network Configuration Protocol (NETCONF)" Internet Engineering Task Force (IETF), RFC 6241, Jun. 2011, 113 pp.
Holzle et al. "Introducing Anthos: An entirely new platform for managing applications in today's multi-cloud world" Google, Inc., Apr. 9, 2019, available at https://cloud.google.com/blog/topics/hybrid-cloud/new-platform-for-managing-applications-in-todays-multi-cloud-world, (last accessed Aug. 22, 2019), 2 pp.

Meyer, "Red Hat Squeezes OpenStack, OpenShift Closer Together" SDxCentral, Nov. 13, 2018, available at https://www.sdxcentral.com/articles/news/red-hat-squeezes-openstack-openshift-closer-together/2018/11/ (last accessed Aug. 22, 2019), 3 pp.
Mockapetris, P. "Domain Names—Concepts and Facilities" Network Working Group, RFC 1034, Nov. 1987, 55 pp.
Mockapetris, P. "Domain Names—Implementation and Specification" Network Working Group, RFC 1035, Nov. 1987, 55 pp.
Rehman et al. "Kubernetes Federation Evolution" The Kubernetes Authors, Dec. 12, 2018, available at https://kubernetes.io/blog/2018/12/12/kubernetes-federation-evolution/ (last accessed Aug. 22, 2019), 8 pp.
YouTube, "FOSDEM 2017—Storage overloaded to smoke? Legolize with LizardFS!," uploaded by LizardFS Software Defined Storage, Feb. 7, 2017, accessed from https://www.youtube.com/watch?v=gz3XAfAbfxl, 1 pp.
YouTube, "FOSDEM 2018 Lizardfs Opennebula Connector release," uploaded by LizardFS Software Defined Storage, Mar. 2, 2018, accessed from https://www.youtube.com/watch?v=MFP1CvggpEM, 1 pp.
YouTube, "LizardFS @ Platige Image," uploaded by LizardFS Software Defined Storage, Jun. 22, 2016, accessed from https://www.youtube.com/watch?v=dZ4Fx48d3jM, 1 pp.
YouTube, "LizardFS as a storage for Elasticsearch," uploaded by LizardFS Software Defined Storage, Sep. 14, 2018, accessed from https://www.youtube.com/watch?v=jSodzbA2091, 1 pp.
YouTube, "LizardFS Intro," uploaded by LizardFS Software Defined Storage, Aug. 7, 2018, accessed from https://www.youtube.com/watch?v=oPASAHS2-D0, 1 pp.
YouTube, "LizardFS on FOSDEM 2018 "Year in Development,"" uploaded by LizardFS Software Defined Storage, Mar. 2, 2018, accessed from https://www.youtube.com/watch?v=vpaanFRRjBk, 1 pp.
YouTube, "LizardFS presentation," uploaded by LizardFS Software Defined Storage, Mar. 28, 2018, accessed from https://www.youtube.com/watch?v=H9dQue6EJz0, 1 pp.
YouTube, "LizardFS Software Defined Storage," uploaded by LizardFS Software Defined Storage, Aug. 16, 2016, accessed from https://www.youtube.com/watch?v=ILjZD97Lbo4, 1 pp.
YouTube,"LizardFS native Windows client," uploaded by LizardFS Software Defined Storage, Jun. 21, 2016, accessed from https://www.youtube.com/watch?v=KKDaeVALHV4, 1 pp.
Extended Search Report from counterpart European Application No. 22174672.0 dated Oct. 4, 2022, 15 pp.
Smith et al., "VXLAN Group Policy Option: draft-smith-vxlan-group-policy-05", Internet Engineering Task Force, Internet Draft, No. 5, Oct. 22, 2018, 6 pp.
Response to Extended Search Report dated Oct. 4, 2022, from counterpart European Application No. 22174672.0 filed May 23, 2023, 63 pp.
Chen et al., "An Application of Spectral-Amplitude-Coding Labels in Optical Signal Buffering Over Optical Packet-Switching Networks", IEEE Communications Letters, IEEE, May 25, 2020, 4 pp.
First Office Action and Search Report, and translation thereof, from counterpart Chinese Application No. 202210556987.X dated Jul. 28, 2023, 21 pp.
Li, "Analysis of Data Transmit Process in BGP MPLS VPNs", National Digital Switching System Engineering & Technological Center, vol. 21, No. 6, Jun. 10, 2011, 5 pp., Translation provided for only the Abstract.
Second Office Action, and Translation thereof, from counterpart Chinese Application No. 202210556987.X dated Feb. 29, 2024, 10 pp.

* cited by examiner

POLICY ENFORCEMENT FOR BARE METAL SERVERS BY TOP OF RACK SWITCHES

This application claims the benefit of U.S. Provisional Patent Application No. 63/194,724, filed May 28, 2021, the entire contents of which is incorporated herein by reference.

TECHNICAL FIELD

This disclosure relates to computer networks and, more specifically, to policy management for computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

SUMMARY

In general, this disclosure describes techniques for determining a policy to apply to packets received by an egress leaf switch of a set of switches arranged according to, e.g., a spine and leaf topology. The switches of a spine and leaf topology may also be referred to as chassis switches (spine switches) and top-of-rack (TOR) switches (leaf switches). Leaf switches of the topology may store data for determining policies to apply to packets to be output from the spine and leaf topology in ternary content-addressable memory (TCAM). In general, TCAM is expensive and draws a high amount of power for a switch. The techniques of this disclosure may be used to reduce an amount of TCAM required to store policies in a leaf switch.

In particular, rather than storing a mapping from a hardware source port by which an ingress switch device receives a packet and a destination address for the packet to policies, the techniques of this disclosure including storing mappings from a source identifier (also referred to herein as a "source tag") and destination address to policies. The source identifier may represent a category for an application, where there may be a relatively small number of categories. For example, the categories may include Web, Application, and Database. A relatively large number of source ports may be mapped to each category, where there may be a direct correspondence between applications and source ports. As development of an application progresses, the source port associated with the application may be updated. For example, the application may be executed on a different server, coupled to an ingress switch device via a different hardware port. Different categories of applications may be associated with different levels of security to be applied to packets from the applications. By using a combination of source identifier and destination address, the number of TCAM entries in a leaf switch for policy enforcement may be greatly reduced, because the TCAM does not need to store separate TCAM entries that map every source port, source address/subnet, source VLAN, or any combination thereof to the policy.

An ingress leaf switch may determine a hardware source port by which a packet is received, then determine a source identifier to which the source port is mapped. The ingress leaf switch may then add the source identifier to a Virtual Extensible Local Area Network (VXLAN) header of the packet and forward the packet to a spine switch of the spine and leaf topology. The spine switch may further forward the packet to an egress leaf switch of the spine and leaf topology. The egress leaf switch may be configured with data mapping source identifiers and destination addresses to policies in TCAM thereof. Thus, when the egress leaf switch receives the packet from the spine switch, the egress leaf switch may determine a policy to apply to the packet from the source identifier of the VXLAN header and a destination address for the packet. The egress leaf switch may then apply the policy to the packet, e.g., to forward the packet or to drop the packet.

In one example, a method includes receiving, by a leaf switch of a plurality of switches arranged according to a spine and leaf topology, a packet from a spine switch of the plurality of switches, the packet being encapsulated with a Virtual Extensible Local Area Network (VXLAN) header; extracting, by the leaf switch, a source identifier value from the VXLAN header; determining, by the leaf switch, a destination address for the packet; determining, by the leaf switch, a policy to apply to the packet according to the source identifier value and the destination address; and applying, by the leaf switch, the policy to the packet.

In another example, a leaf switch device of a plurality of switches arranged according to a spine and leaf topology includes a memory configured to store a plurality of policies, each of the plurality of policies being associated with a respective source identifier value and a respective destination address; a network interface communicatively coupled to a spine switch of the plurality of switches; and a processor implemented in circuitry and configured to: receive a packet from the spine switch via the network interface, the packet being encapsulated with a Virtual Extensible Local Area Network (VXLAN) header; extract a source identifier value from the VXLAN header; determine a destination address for the packet; determine a policy of the plurality of policies to apply to the packet according to the source identifier value and the destination address; and apply the policy to the packet.

In another example, a computer-readable storage medium includes instructions that cause a processor of a leaf switch device of a plurality of switches arranged according to a spine and leaf topology to: receive a packet from a spine switch of the plurality of switches, the packet being encapsulated with a Virtual Extensible Local Area Network (VXLAN) header; extract a source identifier value from the VXLAN header; determine a destination address for the packet; determine a policy of the plurality of policies to apply to the packet according to the source identifier value and the destination address; and apply the policy to the packet.

In another example, a method includes receiving, by a leaf switch of a plurality of switches arranged according to a spine and leaf topology, data mapping a plurality of hardware source ports to a source identifier value from a controller device for the plurality of switches; receiving, by the leaf switch, a packet from a network device separate from the plurality of switches; determining, by the leaf switch, a hardware source port of the leaf switch by which the packet was received; using, by the leaf switch, the data mapping the plurality of source ports to the source identifier value to determine that the source port is mapped to the source identifier value; adding, by the leaf switch, the source identifier value to a VXLAN header for the packet; and forwarding, by the leaf switch, the packet including the source identifier value to a spine switch of the plurality of switches.

In another example, a leaf switch device of a plurality of switch devices arranged according to a spine and leaf topology includes a memory configured to store data mapping a plurality of hardware source ports to a source identifier value received from a controller device for the plurality of switches; receive a packet from a network device separate from the plurality of switches; determine a hardware source port of the leaf switch device by which the packet was received; use the data mapping the plurality of source ports to the source identifier value to determine that the source port is mapped to the source identifier value; add the source identifier value to a VXLAN header for the packet; and forward the packet including the source identifier value to a spine switch of the plurality of switches.

In another example, a computer-readable storage medium includes instructions that, when executed, cause a processor of a leaf switch device of a plurality of switch devices arranged according to a spine and leaf topology to: receive data mapping a plurality of hardware source ports to a source identifier value from a controller device for the plurality of switches; receive a packet from a network device separate from the plurality of switches; determine a hardware source port of the leaf switch device by which the packet was received; use the data mapping the plurality of source ports to the source identifier value to determine that the source port is mapped to the source identifier value; add the source identifier value to a VXLAN header for the packet; and forward the packet including the source identifier value to a spine switch of the plurality of switches.

The details of one or more examples are set forth in the accompanying drawings and the description below. Other features, objects, and advantages will be apparent from the description and drawings, and from the claims.

BRIEF DESCRIPTION OF DRAWINGS

FIG. 5A is a conceptual diagram illustrating a Virtual Extensible Local Area Network (VXLAN) header, while

DETAILED DESCRIPTION

Figure 1:
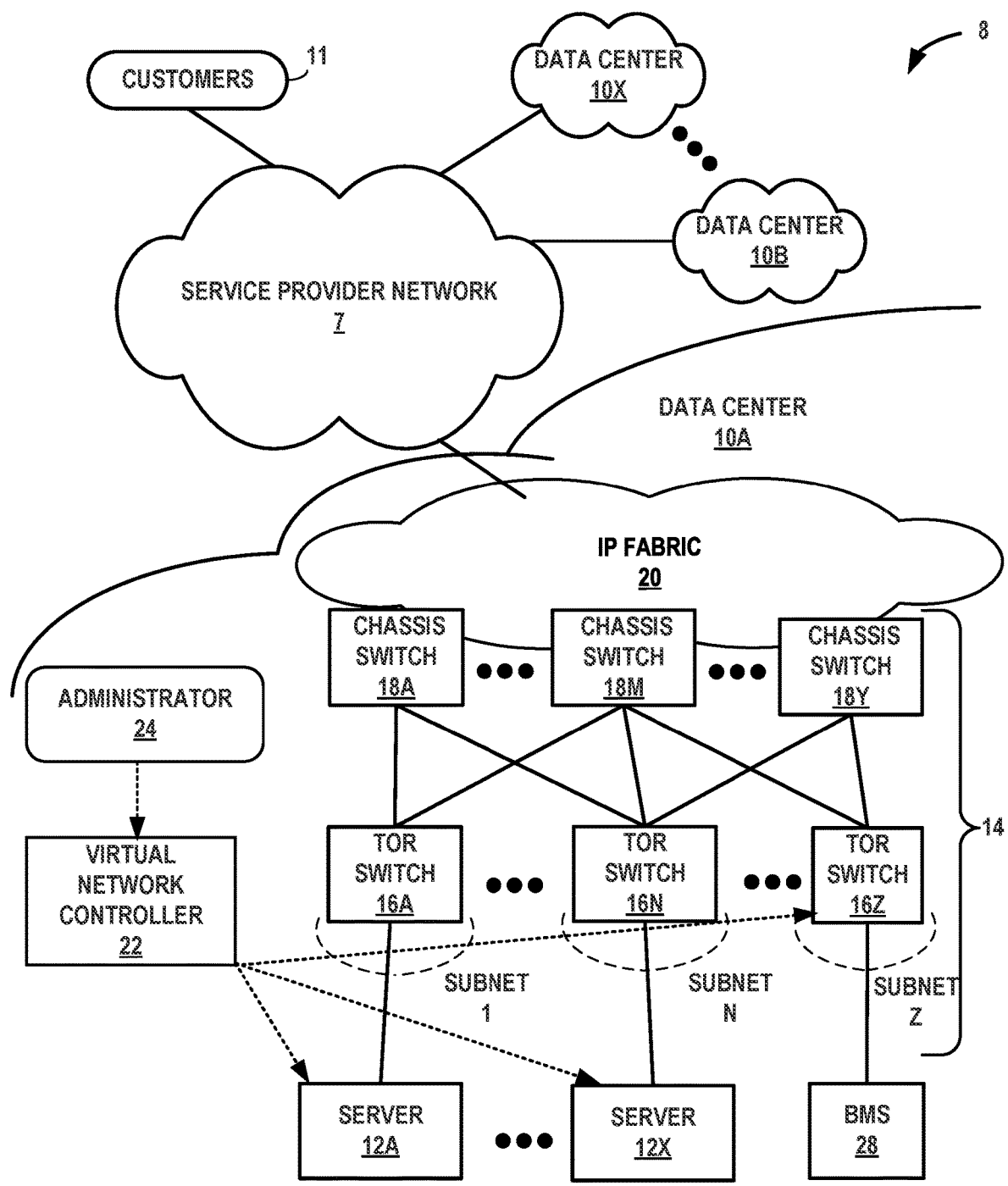
FIG. 1 is a block diagram illustrating an example network having a data center in which examples of the techniques described herein may be implemented.

FIG. 1 is a block diagram illustrating an example network system in which examples of the techniques described herein may be implemented. Network system 2 in the example of FIG. 1 includes data centers 10A-10X (collectively, "data centers 10") interconnected with one another and with customer networks associated with customers 11 via a service provider network 7. In general, each data center 10 provides an operating environment for applications and services for customers 11 coupled to the data center by service provider network 7. Data centers 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, each data center 10 may represent one of many geographically distributed network data centers. As illustrated in the example of FIG. 1, each of data centers 10 may represent a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or supercomputing, and so on. In some embodiments, each of data centers 10 may be individual network servers, network peers, or otherwise.

In this example, each of data centers 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16Z (collectively, "TOR switches 16") coupled to a distribution layer of chassis switches 18A-18M (collectively, "chassis switches 18"). Switch fabric 14 may be configured as, and alternatively referred to as, a spine and leaf topology, where TOR switches 16 may represent leaf switches and chassis switches 18 may represent spine switches. Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 by service provider network 7.

Virtual network controller 22 ("VNC") provides a logically and in some cases physically centralized controller for facilitating operation of one or more virtual networks within each of data centers 10, such as data center 10A, in accordance with one or more techniques of this disclosure. In some examples, virtual network controller 22 may operate in response to configuration input received from network administrator 24. Additional information regarding virtual network controller 22 operating in conjunction with other devices of data center 10A or other software-defined network is found in International Application Number PCT/US2013/044378, filed Jun. 5, 2013, and entitled "PHYSICAL PATH DETERMINATION FOR VIRTUAL NETWORK PACKET FLOWS," which is incorporated by reference as if fully set forth herein.

In some examples, the traffic between any two network devices, such as between network devices within IP fabric 20 (not shown), between servers 12 and customers 11, or between servers 12, for example, can traverse the physical network using many different paths. A packet flow (or "flow") can be defined by the five values used in a header of a packet, or "five-tuple," i.e., the protocol, source IP address, destination IP address, source port and destination port that are used to route packets through the physical network. For example, the protocol specifies the communications protocol, such as TCP or UDP, and source port and destination port refer to source and destination ports of the connection.

A set of one or more packet data units (PDUs) that include a packet header specifying a particular five-tuple represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

In some examples, each of data centers 10 may implement different policies within different computing environments according to the needs of the particular environment. For example, a development environment, a staging environment, and a production environment of data center 10A may each have different requirements for various policies for the network, such as firewall, network, application, and/or global policies.

Furthermore, multiple data centers 10 across different geographic locations may implement different policies within each of their respective internal computing environments due to different customer requirements, networking resources and configurations, etc. If each computing environment within each of data centers 10 were to independently manage its own policies, an administrator may have difficulty ensuring that each policy meets security, reliability, and quality requirements. Furthermore, if each computing environment within each data center were to independently manage its own policies, upgrading one or more of the policies across the multiple data centers may become cumbersome or unmanageable.

As such, network system 8 may implement a scalable, multi-dimensional policy framework to support flexible application of policies for controlling network traffic among workloads executing within one or more computing environments for data centers 10 that may be categorized along multiple different dimensions. Such categories may include applications, deployments, application tiers, geographic sites, virtual networks, virtual machines, interfaces, projects, security requirements, quality requirements, physical devices, such as routers or switches, users, and/or compliance requirements, to provide a few examples. Each type of category represents a dimension for workloads that generate or process network traffic of data centers 10. In some examples, the policy framework described herein permits administrator 24 to tag objects that execute or otherwise process workloads with specific dimensions across multiple levels.

In various examples, policy controller 23 distributes policy rules including tags for objects at a project level. However, policy controller 23 may additionally or alternatively distributing policy rules including tags specifying various different object levels, such as a global environment level, a project level, a virtual network level, a virtual machine level, or an interface level.

Policy controller 23 may use a plurality of configuration objects to implement the one or more policies. As one example, policy controller 23 may apply a first set of configuration objects at a global level. The first set configuration objects includes global application policy sets, global firewall policies, global firewall rules, and global tags across a plurality of levels and/or categories. Policy controller 23 distributes, for example to the virtual routers, the first set of configuration objects at the global level. Policy controller 23 matches global tags associated with global application policy sets, global firewall policies, and global firewall rules to objects tagged with the global tags. Based on the global application policy sets, global firewall policies, and global firewall rules, policy controller 23 allows or blocks network traffic between interfaces of the objects tagged with the global tags. The interfaces may be virtual machine interfaces (VMIs), for instance, or switch interfaces of switches 16, 18.

Policy controller 23 may apply a second set of configuration objects at a project level. The second set of policy rules may include project-specific application policy sets, firewall policies, firewall rules, and tags across a plurality of levels. Policy controller 23 distributes the second set of configuration objects at the project level. Policy controller 23 matches project tags associated with project-specific application policy sets, firewall policies, and firewall rules to objects tagged with the project tags. Based on the project-specific application policy sets, firewall policies, and firewall rules, policy controller 23 allows or blocks network traffic between interfaces of the objects tagged with the project tags.

In further examples, policy controller 23 may specify lower-level configuration objects, such as application policy sets, firewall policies, firewall rules, and tags defined at a virtual network-specific level, a virtual machine-specific level, and/or an interface-specific level. By doing so, policy controller 23 may apply a hierarchical set of policies to a plurality of objects within one or more data centers 10. Thus, the techniques of the disclosure allow for distribution of simplified traffic policies that are scalable and robust across many different types of deployments and execution environments. Additional description is found in U.S. patent application Ser. No. 15/819,522, filed Nov. 22, 2017 and entitled "Scalable Policy Management for Virtual Networks," which is incorporated by reference in its entirety.

As described herein, a "tag" may refer to a data structure that provides information to categorize an object according to a particular value or set of values. A tag may include a tag identifier (ID). In one example, tags map security requirements for the corresponding objects. Tags may be predefined (e.g., such as a tag for an application, deployment, application tier, or geographic site), or may be implicitly assigned during provisioning (e.g., a tag describing infrastructure, a rack, a cluster, or a data center which is provisioned to support the application). In some examples, multiple tags are applied to a single object (e.g., an "application" and "geographic site" tag may be applied to a single virtual machine), but the object may only have a single tag per type and/or category. In further examples, a user may define "labels" to be used as keys for the key/value pairs of tags such that the user may customize or create his or her own categories for tagging objects. Furthermore, as used herein, "tagging" an object refers to categorizing the object in a category specified by a tag included in a policy rule. A source tag, also referred to herein as a source identifier, may represent a category for an application, where various categories of applications may be associated with different levels of security operations to be applied to packets originating from applications of that category.

Policies may be expressed along multiple dimensions in terms of tags corresponding to categories to which the tagged objects correspond. Distributed VN agents executing on computing devices that host the workloads, e.g., one or more of servers 12, may then apply the policies to tagged objects that are members of categories to allow or deny a traffic flow between the objects tagged with one or more categories for one or more dimensions. At least in some cases, the VN agents apply the policies at the interface level of one or more virtual machines to permit or block network traffic flowing to and/or from interfaces of the one or more virtual machines.

In some examples, an extension of a Border Gateway Protocol (BGP) is provided for communicating the policy framework between categories. For example, a VN agent may receive, from a policy controller executed as one example by virtual network controller 22, a BGP message that includes an extended community specifying one or more policy rules, each policy rule including one or more tags that include tag identifiers (which are converted from the key/value pairs) corresponding to categories that include the tagged objects. Further, each policy rule of the one or more policy rules may specify whether to permit or block network traffic between objects tagged by the one or more tags. Additional information with respect to the implementation of BGP extended communities is described in "BGP Extended Communities Attribute," RFC 4360, Internet Engineering Task Force (IETF), February 2006, available at https://tools.ietf.org/rfc/rfc4360, the entire contents of which is incorporated herein by reference.

In this respect, scalable deployment of policies across different environments may be achieved within a plurality of data centers 10 in a manner that potentially reduces the complexity and simplifies management of such policies within the plurality of data centers 10. More information concerning policy distribution can be found in above noted U.S. patent application Ser. No. 15/819,522, entitled "SCALABLE POLICY MANAGEMENT FOR VIRTUAL NETWORKS," filed Nov. 21, 2017.

However, the scalable policy deployment may not accommodate all of the various environments present in data centers and other networks. As further shown in the example of FIG. 1, switch fabric 14 may include additional TOR switches 16A-16Z that interface with so-called bare metal servers ("BMS") 28. BMS 28 may represent a server dedicated for use by a single customer, which may also be called a "single-tenant server." Unlike servers 12 in which multiple customers (or, again, in other words, "tenants") may interact with the same physical hardware, i.e., server 12, to interface with their individually allocated virtual router, BMS 28 is dedicated for use only by a single customer.

BMS 28 may provide dedicated hardware for use by the single customer to avoid so-called "noisy neighbor problems" that occur in multi-tenant servers 12. That is, while each customer may receive a dedicated virtual router that generally is not impacted by operation of any other dedicated virtual routers by one of multi-tenant servers 12, in certain contexts, the other virtual routers may consume resources (e.g., processor cycles, memory, bandwidth, etc.) that would have otherwise been available for another customer's virtual routers, thereby degrading the performance of the remaining virtual routers (much as a noisy neighbor may create problems for other residents, hence the name "noisy neighbor problems"). As such, BMS 28 may provide a dedicated hardware environment that avoids such noisy neighbor problems, and thereby potentially ensures that the customer processing demands are more likely to be met. One premise driving the use of BMS 28 therefore lies in exclusivity, and as a result, some data center operators may not allow BMS 28 to execute the above noted VN agents responsible for enforcing the policies within BMS 28.

Furthermore, certain devices may not support all of the features enabled by the scalable policy deployment discussed above. As an example, some network devices may only support basic firewall functions, and not full featured firewall functions enabled through use of the scalable policy deployment discussed above, thereby detracting from the usefulness of the policy deployment.

In operation, virtual network controller 22 may obtain a policy to be enforced by TOR switch 16Z coupled to BMS 28. Virtual network controller 22 may obtain the policy from a database or other memory and/or storage device. Administrator 24 may specify the policy or otherwise generate the policy.

Virtual network controller 22 may next convert the policy into configuration data supported by TOR switch 16Z. As described above, the policy may include an intent-based policy that, for firewall or other security services, may identify flows that are to be blocked from reaching BMS 28 and/or transmitted from BMS 28. The intent-based policy may also identify flows that are permitted to reach BMS 28 and/or transmitted from BMS 28. Virtual network controller 22 may convert the intent-based policies into configuration data representative of access control lists (ACLs) that are supported by TOR switch 16Z.

The access control lists may include one or more entries that each identifies a flow, and an action to be performed with respect to the identified flow (such as "drop" or "forward"). In accordance with the techniques of this disclosure, the data identifying a flow may include a source identifier (also referred to herein as a "source tag") and a destination Internet protocol (IP) address. In particular, when one of TOR switches 16A-16N receives a packet from a respective one of servers 12, the one of TOR switches 16A-16N may add a source identifier to a Virtual Extensible Local Area Network (VXLAN) header of the packet. The source identifier may correspond to a value representing a category for an application that generated the packet, e.g., "development," "staging," "production," or the like.

TOR switches 16 may be configured with mapping data that maps source ports thereof by which packets are received to respective source identifiers. Various applications of a common category may be executed by a server connected to one of TOR switches 16 via a particular hardware port of the one of TOR switches 16. Each of the applications may be assigned to a category, e.g., a stage of development for the applications. Virtual network controller 22 may be configured to distribute the source identifiers to TOR switches 16. Thus, TOR switches 16 may add a source identifier (source tag) to a VXLAN header for the packets.

Virtual network controller 22 may also configure TOR switches 16, such as TOR switch 16Z, to enforce an ACL (policy) with respect to network traffic directed to external servers, such as, for example, BMS 28. That is, TOR switch 16Z, once configured according to the configuration data, may apply the ACLs to any flows received by the TOR switch 16Z in order to enforce the policy in support of BMS 28. Similarly, other TOR switches 16 may also be configured to enforce similar policies, albeit with respect to other servers 12 (or other bare metal servers not shown in FIG. 1). Thus, the same TOR switch may act as both an ingress switch and an egress switch, where when acting as an ingress switch, the TOR switch may add a source identifier (source tag) to a VXLAN header of a received packet, and when acting as an egress switch, the TOR switch may enforce a policy indicated by a combination of the source identifier and a destination IP address.

In particular, TOR switches 16, such as TOR switch 16Z, may store data defining the policies (e.g., ACL entries) in ternary content addressable memory (TCAM). TCAM is relatively expensive and provides high speed search for data stored therein. Due to the expense of TCAM, reducing TCAM consumption can reduce the expense of a corresponding device, e.g., TOR switch 16Z. By storing policies associated with source identifiers (representing a category for a corresponding application) and a destination IP address, the number of policies/ACL entries to be stored in TCAM of TOR switches 16 may be reduced. Thus, the techniques of this disclosure may reduce the expense of TOR switches that perform policy enforcement on traffic to be sent to, e.g., a BMS or other server device. Moreover, TCAM generally requires additional circuitry for each entry thereof, which may further increase physical hardware size, electricity consumption, and heat production of TCAM relative to other types of memory. As such, reducing the amount of TCAM consumed, e.g., according to the techniques of this disclosure, may also reduce physical hardware size, electricity consumption, and heat production.

In particular, if a policy were mapped from a source port and destination IP address to a policy, the amount of TCAM consumed to store such mapping data would be significant. By contrast, the techniques of this disclosure allow for a many-to-one mapping of source ports to application categories. There may be many thousands of source ports mapped to a single application category. Thus, by storing data mapping source identifiers and destination IP addresses to a policy (e.g., an ACL entry), the techniques of this disclosure may significantly reduce TCAM consumption, while still maintaining the high speed search access provided by TCAM for performing policy enforcement.

Figure 2:
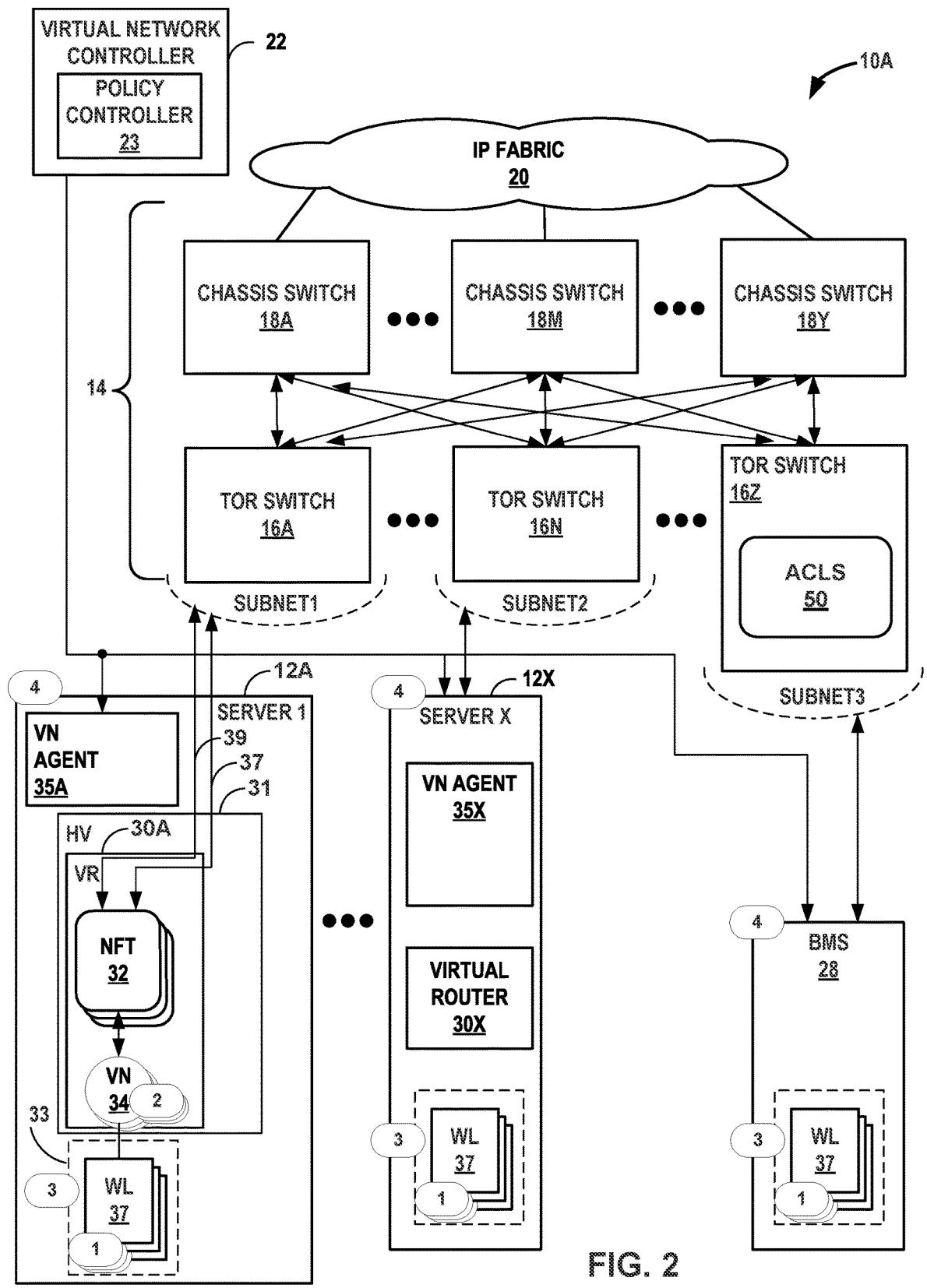
FIG. 2 is a block diagram illustrating an example implementation of the data center of FIG. 1 in further detail.

FIG. 2 is a block diagram illustrating an example implementation of data center 10A of FIG. 1 in further detail. In the example of FIG. 2, data center 10A includes an overlay network that extends switch fabric 14 from physical switches 16, 18 to software or "virtual" switches 30A-30X (collectively, "virtual routers 30" or "VR 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various processes may be used to transport packets within and across virtual networks 34 over the physical network. In some examples, virtual networks 34 may provide multicast service without requiring multicast support in the underlying physical network.

Each virtual router 30 may execute within a hypervisor, a host operating system or other component of each of servers 12. Each of servers 12 may represent an x86 or other general-purpose server, or a special-purpose server, capable of executing workloads (WL) 37. In the example of FIG. 2, virtual router 30A executes within hypervisor 31, also often referred to as a virtual machine manager (VMM) and may be denoted as "HV" in the example of FIG. 2, which provides a virtualization platform that allows multiple operating systems to concurrently execute within one of servers 12. In the example of FIG. 2, virtual router 30A manages virtual networks (VN) 34, each of which provides a network environment for execution of one or more virtual machines (VMs) (that may execute one or more of WLs 37) within the virtualization platform provided by hypervisor 31. Each VM is associated with one of the virtual networks and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of the VMs may represent containers, another form of virtualized execution environment. That is, both virtual machines and container are examples of virtualized execution environments for executing workloads.

In general, each WL 37 may be any type of software application and may be assigned a virtual address for use within a corresponding virtual network 34, where each of the virtual networks may be a different virtual subnet provided by virtual router 30A. A WL 37 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10A. VN agents 35 may operate as a proxy for control plane messages between WLs 37 and virtual network controller 22. For example, a WL 37 may request to send a message using its virtual address via the VN agent 35A, and VN agent 35A may in turn send the message and request that a response to the message be received for the virtual address of one of WLs 27 that originated the first message. In some cases, a WL 37 may invoke a procedure or function call presented by an application programming interface of VN agent 35A, and the VN agent 35A may handle encapsulation of the message, including addressing. Each VN agent 35 may also apply one or more policies to one or more categories, as described in more detail below.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VXLAN, MPLS over GRE, MPLS over UDP, etc.

As noted above, virtual network controller 22 provides a logically centralized controller for facilitating operation of one or more virtual networks within data center 10A. Virtual network controller 22 may, for example, maintain a routing information base, e.g., one or more routing tables that store routing information for the physical network as well as one or more overlay networks of data center 10A. Switches 16, 18 and virtual routers 30 may also maintain routing information, such as one or more routing and/or forwarding tables. In one example, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

As further shown in the example of FIG. 2, virtual network controller 22 includes a policy controller 23. Policy controller 23 may represent a unit configured to tag a plurality of objects across a plurality of levels. In some examples, the plurality of levels include a level of an object, such as a global environment level, a project level, a virtual network level, a virtual machine level, or an interface level of the object. Policy controller 23 may also, in some instances, tag the plurality of objects across a plurality of categories. In some examples, the plurality of categories include applications executing within VMs 36, deployments, application tiers, geographic sites, virtual networks, WLs 37, interfaces, projects, security requirements, quality requirements, users, or compliance requirements.

In some examples, policy controller 23 further distributes, to respective VN agents 35, a plurality of policies. Each policy of the plurality of policies includes one or more policy rules for controlling network traffic. Each policy rule of the plurality of policy rules specifies one or more tags, each tag further specifying one or more dimensions of the categories.

Upon receiving the plurality of policies, each VN agent 35 applies the one or more policy rules of each of the plurality of policies to tagged objects corresponding to tags of the one or more policy rules to control network traffic between the tagged objects. For example, VN agents 35 under the direction of policy controller 23 express the one or more policy rules at logical interfaces of WLs 37 that are tagged with tags corresponding to tags of the one or more policy rules. VN agents 35 permit or block network traffic to and/or from the logical interfaces based on the one or more policy rules.

In some examples, policy controller 23 distributes one or more policy rules via Border Gateway Protocol (BGP). Such a BGP message may include an action for a particular traffic flow, such as allowing or denying the flow and a list of one or more destination protocols and ports for application of the specified action. In such an example, the BGP message may further specify one or more tags (as a tag identifier—ID) for an object as an extended community for BGP. Additional information with respect to BGP is described in "BGP MPLS-Based Ethernet VPN," RFC 7432, Internet Engineering Task Force (IETF), February 2015, available at https://tools.ietf.org/html/rfc7432, the entire contents of which is incorporated herein by reference.

As further shown in the example of FIG. 2, policy controller 23 may distribute policy rules in the form of access control lists (ACLS) 50. Policy controller 23 may convert the above described policies into ACLs 50, and then deploy ACLs 50 (which may represent one or more policy rules) to TOR switch 16Z. TOR switch 16Z may then apply ACLs 50 to network traffic destined for BMS 28. BMS 28 may, given the restrictive execution environment, only execute WLs 37 (and in some instances, not even WLs 37) but not, as shown in the example of FIG. 2, a virtual router 30 or VN agent 35. In accordance with the techniques of this disclosure, ACLs 50 may include data mapping a source identifier and destination IP address to a policy (e.g., an ACL entry). Such data may be stored in TCAM of TOR switch 16Z.

Figure 3:
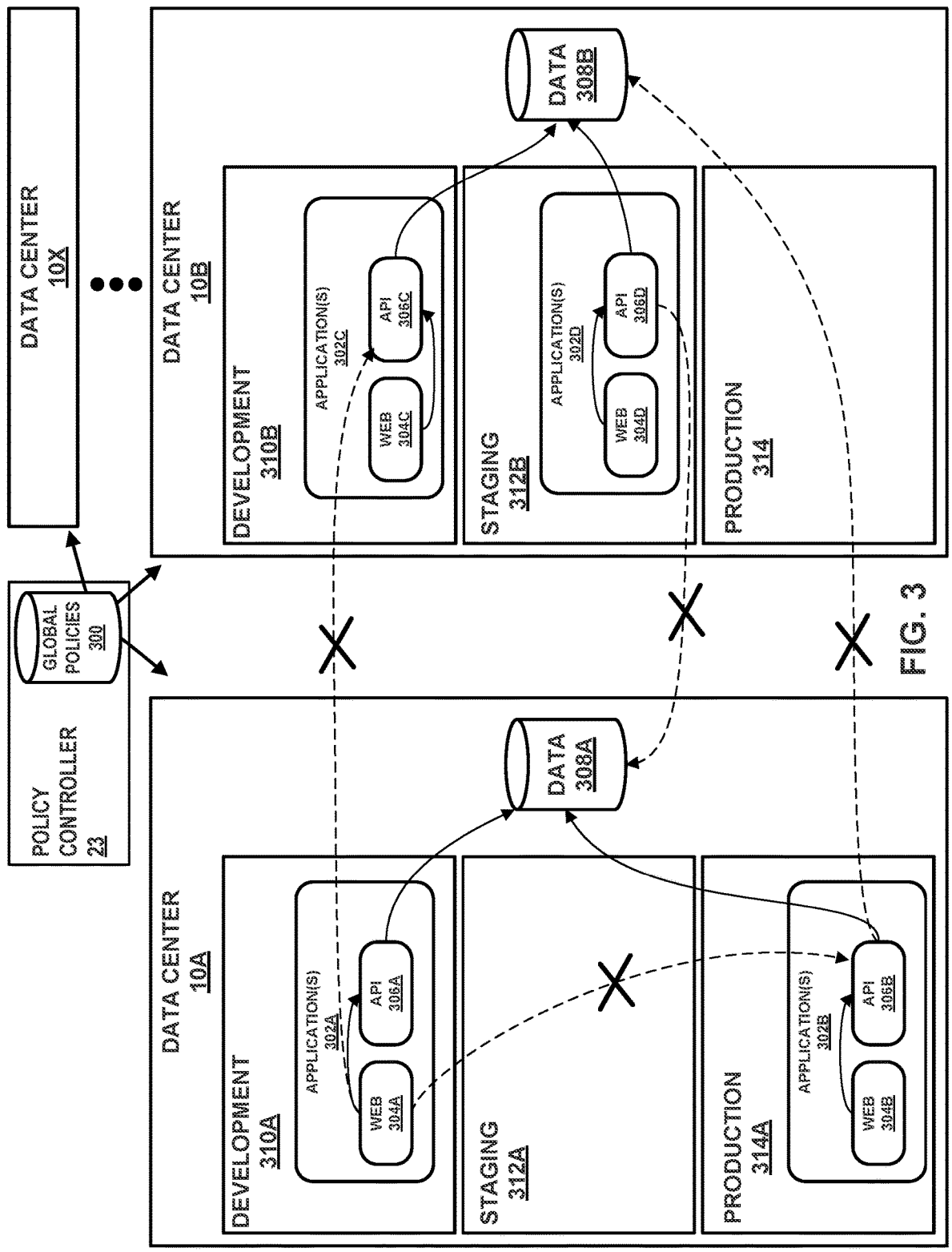
FIG. 3 is a block diagram illustrating an example of a plurality of data centers in which examples of the techniques described herein may be implemented.

FIG. 3 is a block diagram illustrating an example of a plurality of data centers 10 in which examples of the techniques described herein may be implemented. Each of data centers 10A-10X (collectively "datacenters 10") may operate in a substantially similar fashion to datacenters 10 of FIG. 1 and FIG. 2. In some examples, one or more of datacenters 10 implements a cloud environment executing Openstack, while in another example, one or more of data centers 10 is a cloud environment executing Kubernetes, while in yet another example, one or more of data centers 10 implements a cloud environment executing Amazon Web Services, while in yet another example, one or more of data centers 10 executes on "bare metal" infrastructure. In some examples, each of data centers 10 executes a different infrastructure than each other data center 10.

In the example of FIG. 3, each of data centers 10 comprises a database 308 and three different environments: a development environment 310, a staging environment 312, and a production environment 314. Each environment of each data center 10 is capable of executing one or more applications 302A-302D (collectively, "applications 302"), such as application 302A executing within development environment 310A of data center 10A, application 302B executing within production environment 314A of data center 10A, application 302C executing within development environment 310B of data center 10B, and application 302D executing within staging environment 312B of data center 10B. In one example, each application 302 is an instance of the same type of finance application. Policies as described herein are robust and extensible for application in many different types of cloud environments described above.

Within an environment, each application may include a plurality of processes and sub-processes. In the example of FIG. 3, application 302A of development environment 310A executes web process 304A and Application Program Interface (API) process 306A. Further, application 302B of production environment 314A executes web process 304B and API process 306B. Application 302C of development environment 310B executes web process 304C and API process 306C. Still further, application 302D of staging environment 312B executes web process 304D and API process 306D. However, in other examples, each application 302 of a respective environment 310A, 312A, 314A, 310B, 312B, or 314B may execute additional or different processes than each other application 302. Furthermore, in some examples, the applications executed within each respective environment 310A, 310B, 312A, 312B, 314A, and 314B may be similar or different from the applications executed within each other environment 310A, 310B, 312A, 312B, 314A, and 314B.

It may be desirable to ensure that processes 304, 306 of each application 302 of a respective environment 310, 312, 314 does not exchange network traffic with processes 304, 306 of an application 302 within a different environment 310, 312, 314, while still permitting network traffic to flow between different processes 304, 306 within the same application 302. For example, an administrator may desire to allow network traffic between web process 304A and API process 306A because each of web process 304A and API process 306A operate within the same application 302A within development environment 310A. Further, the administrator may desire to prevent network traffic between web process 304A (e.g., operating within development environment 310A of data center 10A) and API process 306B (e.g., operating within production environment 314A of data center 10A) or between web process 304A (e.g., operating within development environment 310A of data center 10A) and API process 306C (e.g., operating within development environment 310B of data center 10B). Further, an administrator may desire to permit processes 304, 306 executing within an application 302 within the same data center 10 to access the same database 308, regardless of the specific environment 310, 312, or 314 within which the particular application 302 executes. For example, an administrator may desire to allow API process 306A executing within application 302A and API process 306B executing within application 302B to each access database 308A.

The administrator may also desire to allocate different port ranges for use by each of application 302A, application 302B, application 302C, and/or application 302D to satisfy various security requirements, quality requirements, compliance requirements, or user requirements. Thus, if the administrator were to implement a single application-specific firewall policy (e.g., a firewall policy specific to the application type of each of applications 302A, 302B, 302C, and 302D), the firewall policy may not function as intended because each of applications 302A, 302B, 302C, and 302D use different port ranges. Furthermore, if the administrator were to independently manage network traffic policies for each process 304, 306 within each application 302 within each environment 312, 312, and 314 within each data center 10, the administrator may have difficulty ensuring that each network traffic policy meets security, reliability, and quality requirements. Furthermore, upgrading one or more of the policies across multiple data centers 10 may become cumbersome or unmanageable.

According to the techniques of this disclosure, applications within development environments 310 (e.g., applications 302A, 302C) may be associated with source ports that are mapped to a "development" source identifier (source tag); applications within staging environments 312 (e.g., applications 302D) may be associated with source ports that are mapped to a "staging" source identifier (source tag); and applications within production environment 314 (e.g., applications 302B) may be associated with source ports that are mapped to a "production" source identifier (source tag).

Figure 4:
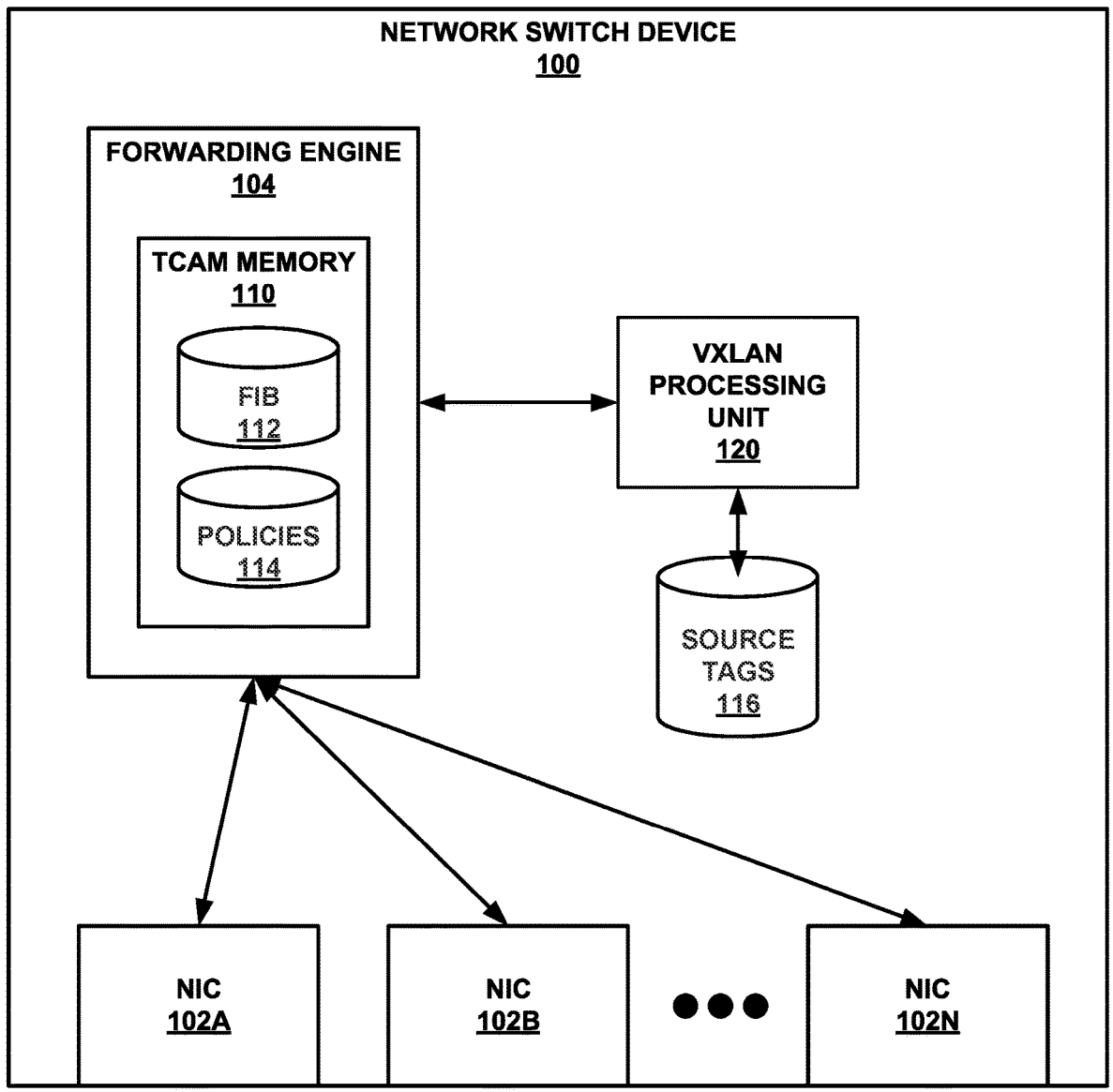
FIG. 4 is a block diagram illustrating an example network switch device according to the techniques of this disclosure.

FIG. 4 is a block diagram illustrating an example network switch device 100 according to the techniques of this disclosure. In this example, network switch device 100 includes forwarding engine 104, network interface cards (NICs) 102A-102N (NICs 102), Virtual Extensible Local Area Network (VXLAN) processing unit 120, and source tags memory 116. NICs 104 include network interfaces configured to exchange packets using links of an underlying physical network. Such network interfaces may be, for example, Ethernet interfaces.

Forwarding engine 104 in this example includes Ternary Content-Addressable Memory (TCAM) memory 110. In other examples, forwarding engine 104 may include other types of high-speed memory, such as Reduced-Latency Dynamic Random Access Memory (RLDRAM) or Synchronous Dynamic Random Access Memory (SDRAM). In the example of FIG. 4, TCAM memory 110 stores forwarding information base (FIB) 112 and policies 114. FIB 112 represents a forwarding table mapping data of received packets to "next hops," corresponding to one of NICs 102. In general, when network switch device 100 receives a packet via one of NICs 102, forwarding engine 104 may use FIB 112 to determine a different one of NICs 102 by which to forward the packet.

In this example, network switch device 100 may represent a leaf switch device of a spine and leaf topology. For example, network switch device 100 may correspond to one of TOR switches 16 of FIGS. 1 and 2. Each of NICs 102 may include one or more hardware ports by which to physically interface with other network devices. Certain NICs of NICs 102 may be coupled to spine switches (e.g., one of chassis switches 18 of FIGS. 1 and 2), while other NICs of NICs 102 may be coupled to devices external to the spine and leaf topology (switch fabric 14 of FIGS. 1 and 2). For example, servers 12 and BMS 28 of FIGS. 1 and 2 may be considered to be devices external to the spine and leaf topology.

Network switch device 100 may receive data defining mappings from hardware source ports thereof (e.g., hardware ports of NICs 102) to source tags and store such data in source tags 116. In general, the source ports may correspond to various applications that may generate packets. As explained above with respect to FIG. 3, an application may be assigned to an application category, where the possible categories may include, for example, applications in development, applications in a staging area, or applications in production. Thus, an application may be executed by a device coupled to network switch device 100 via a particular hardware source port of one of NICs 102. Source tags 116 represent the various categories for the applications. Accordingly, source tags 116 may include data mapping ports for applications that are currently assigned to the "development" category to a "development" source identifier (or source tag). Likewise, source tags 116 may include data mapping ports for applications that are currently assigned to the "staging" category to a "staging" source identifier/tag. Similarly, source tags 116 may include data mapping ports for applications that are currently assigned to the "production" category to a "production" source identifier/tag.

Thus, when network switch device 100 receives a packet via one of NICs 102 that corresponds to a device external to the spine and leaf topology (i.e., outside of the switch fabric), FIB 112 may indicate that the packet is to be sent to VXLAN processing unit 120 to be encapsulated with a VXLAN header. For example, FIB 112 may map a "next hop" of the packet to a logical interface associated with VXLAN processing unit 120.

In accordance with the techniques of this disclosure, VXLAN processing unit 120 may determine a source tag (or source identifier) to be added to the VXLAN header using data of source tags 116. For example, the packet may have originated from an application of a particular category, e.g., an application in a "development" category, a "staging" category, or a "production" category. VXLAN processing unit 120 may determine a source port by which the packet was received, which corresponds to the application that produced the packet. VXLAN processing unit 120 may perform a lookup in source tags 116 using the source port to determine a source identifier to be added to the VXLAN header of the packet. VXLAN processing unit 120 may further determine a VXLAN segment identifier for the packet using other mapping data (not shown in FIG. 4) according to conventional VXLAN techniques.

After constructing the VXLAN header and encapsulating the packet with the VXLAN header, VXLAN processing unit 120 may send the packet back to forwarding engine 104. Forwarding engine 104 may then send the packet to one of NICs 102 according to the VXLAN segment identifier of the VXLAN header, to direct the packet to a spine switch (e.g., one of chassis switches 18 of FIGS. 1 and 2).

On the other hand, when network switch device 100 receives a VXLAN packet from a spine switch of the switch fabric, forwarding engine 104 may send the packet to VXLAN processing unit 120 to extract a source identifier (source tag) from the VXLAN header of the packet. Forwarding engine 104 may then determine a destination IP address for the packet and perform a lookup in policies 114 using the source identifier from the VXLAN header and the destination IP address. That is, policies 114 may map the combination of the source identifier (source tag) and destination IP address to a particular policy. Such policy may be to forward the packet normally, drop the packet, send the packet to a device that performs additional security (e.g., deep packet inspection, a firewall, or the like), or other such policies. Thus, network switch device 100 may perform the policy to which the source identifier and destination IP address are mapped in policies 114.

Figure 5A:
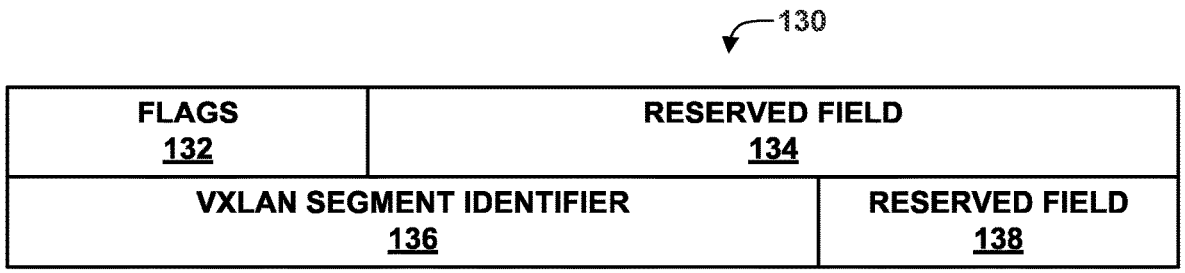
Figure 5B:
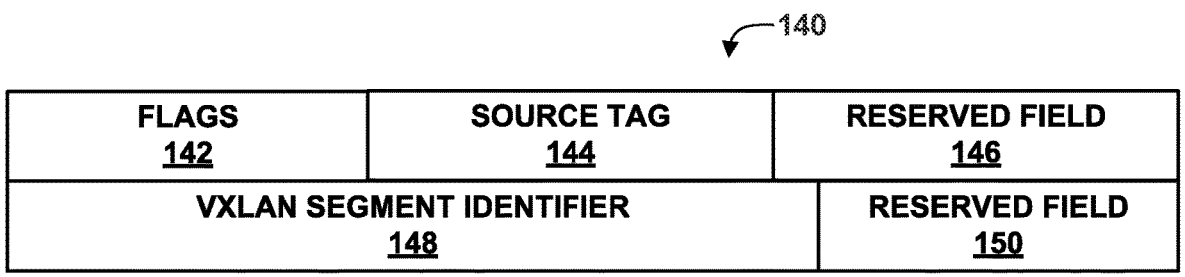
FIGS. 5B and 5C are conceptual diagrams illustrating example VXLAN headers including source tags (source identifiers) according to various examples of the techniques of this disclosure.
Figure 5C:
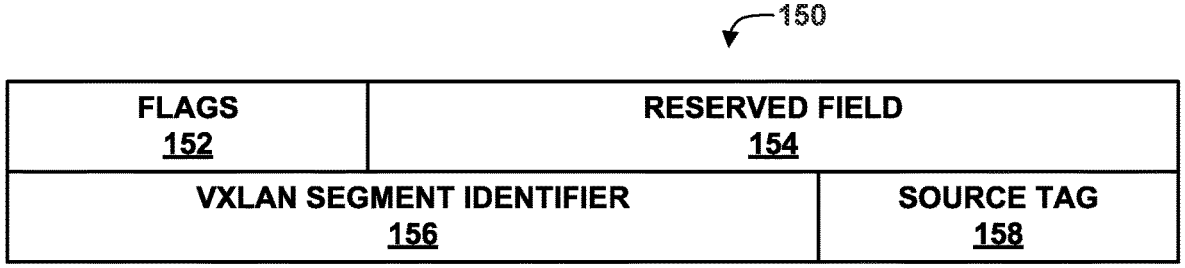

FIG. 5A is a conceptual diagram illustrating a Virtual Extensible Local Area Network (VXLAN) header, while FIGS. 5B and 5C are conceptual diagrams illustrating example VXLAN headers including source tags (source identifiers) according to various examples of the techniques of this disclosure.

FIG. 5A depicts VXLAN header 130 including flags 132, VXLAN segment identifier 136, and reserved fields 134, 138. In accordance with Mahalingam et al., "Virtual eXtensible Local Area Network (VXLAN): A Framework for Overlaying Virtualized Layer 2 Networks over Layer 3 Networks," Request for Comments 7348 (RFC 7348), August 2014, available at datatracker.ietf.org/doc/html/rfc7348 (hereinafter, "RFC 7348"), flags 132 includes eight bits, including four reserved bits, one I-bit (which must be set to 1 for a valid VXLAN Network Identifier (VNI)), and three more reserved bits after the I-bit. VXLAN segment identifier 136, per RFC 7348, is a 24-bit value that designates an individual VXLAN overlay network on which communicating virtual machines (VMs) are situated. In general, reserved fields 134, 138 include 24 bits and 8 bits, respectively, that are reserved for future use.

In accordance with the techniques of this disclosure, a source identifier (or source tag) may be specified in one of reserved fields 134, 138. FIG. 5B depicts one example VXLAN header 140 including flags 142, source tag 144, reserved field 146, VXLAN segment identifier 148, and reserved field 150. In general, flags 142 may correspond to flags 132 of FIG. 5A and VXLAN segment identifier 148 may correspond to VXLAN segment identifier 136 of FIG. 5A. Source tag 144 may include a number of bits up to 24 bits. Thus, reserved field 146 may be excluded (if source tag 144 has 24 bits) or have a number of bits that is the difference between 24 bits and the number of bits included in source tag 144.

FIG. 5C depicts another example VXLAN header 150 including flags 152, source tag reserved field 154, VXLAN segment identifier 156, and source tag 158. In general, flags 152 may correspond to flags 132 of FIG. 5A and VXLAN segment identifier 156 may correspond to VXLAN segment identifier 136 of FIG. 5A. Source tag 158 in this example includes eight bits to specify a source identifier for a packet encapsulated by VXLAN header 150.

In the example of FIGS. 5B and 5C, source tag 144 and source tag 158 include values for a source identifier (or source tag) representing a source application from which a packet encapsulated by a corresponding one of VXLAN header 140 or VXLAN header 150 originates. For example, one of TOR switches 16, network switch device 100, or other ingress leaf switch of a spine and leaf topology may add a value for source tag 144 or source tag 158 to the VXLAN header. As discussed above, the source tag value may represent a category for the source application. In particular, the ingress leaf switch device may determine the value for the source tag from, e.g., source tags 116 (FIG. 4) that map a hardware source port by which the packet was received to a corresponding source identifier specifying a category for the application. Similarly, according to the techniques of this disclosure, an egress leaf switch device may determine a policy to apply to the packet from the value of source tag 144 or source tag 158 and a destination IP address for the packet, e.g., according to policies 114 of FIG. 4.

Figure 6:
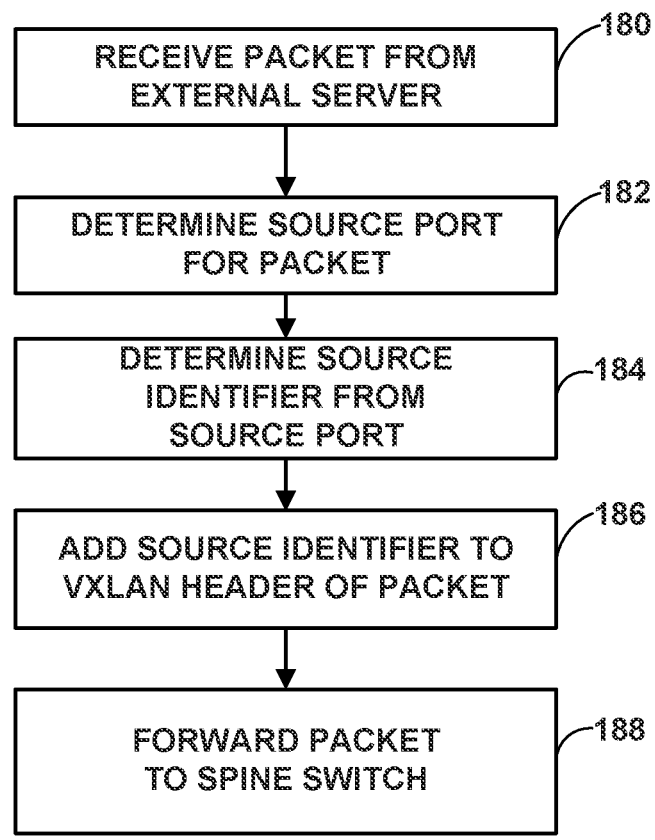
FIG. 6 is a flowchart illustrating an example method of adding a source tag (identifier) to a received packet according to the techniques of this disclosure.

FIG. 6 is a flowchart illustrating an example method of adding a source identifier to a received packet according to the techniques of this disclosure. The method of FIG. 6 may generally be performed by an ingress leaf switch device, such as one of TOR switches 16 of FIGS. 1 and 2 or network switch device 100 of FIG. 4. The leaf switch device may act as an ingress to a spine and leaf topology when receiving a packet from a device outside of the spine and leaf topology, such as one of servers 12 or BMS 28 of FIGS. 1 and 2. For purposes of example and explanation, the method of FIG. 6 is explained with respect to TOR switch 16A of FIGS. 1 and 2. The same switch may act as both an ingress and an egress switch for different packets or packet flows.

Initially, TOR switch 16A may be configured by, e.g., policy controller 23 with data that maps hardware source ports by which packets are received to source identifiers. TOR switch 16A receives a packet from an external server (180), such as server 12A. TOR switch 16A may determine the hardware source port by which the packet was received. Thus, TOR switch 16A may determine the source port for the packet (182).

TOR switch 16A may then use data such as source tags 116 (FIG. 4) that maps source ports to source tags (or source identifiers) to determine a source identifier from the source port (184). TOR switch 16A may then add the source identifier to the VXLAN header of the packet (186), e.g., as shown in FIG. 5B or 5C. TOR switch 16A may then determine a next hop for the packet, e.g., using a destination port (VXLAN port) according to data of FIB 112 (FIG. 4). The destination port may be specified in the outer UDP header of the packet. The next hop generally corresponds to a spine switch, such as one of chassis switches 18 of FIGS. 1 and 2. TOR switch 16A may then forward the packet to the spine switch (188).

In this manner, the method of FIG. 6 represents an example of a method including receiving, by an ingress leaf switch of a plurality of switches arranged according to a spine and leaf topology, data mapping a plurality of source ports to a source identifier value from a controller device for the plurality of switches; receiving a packet from a network device separate from the plurality of switches; determining, by the leaf switch, a hardware source port of the leaf switch by which the second packet was received; using, by the leaf switch, the data mapping the plurality of source ports to the second source identifier value to determine that the source port is mapped to the second source identifier value; adding, by the leaf switch, the second source identifier value to a second VXLAN header for the second packet; and forwarding, by the leaf switch, the second packet including the second source identifier value to a second spine switch of the plurality of switches.

Figure 7:
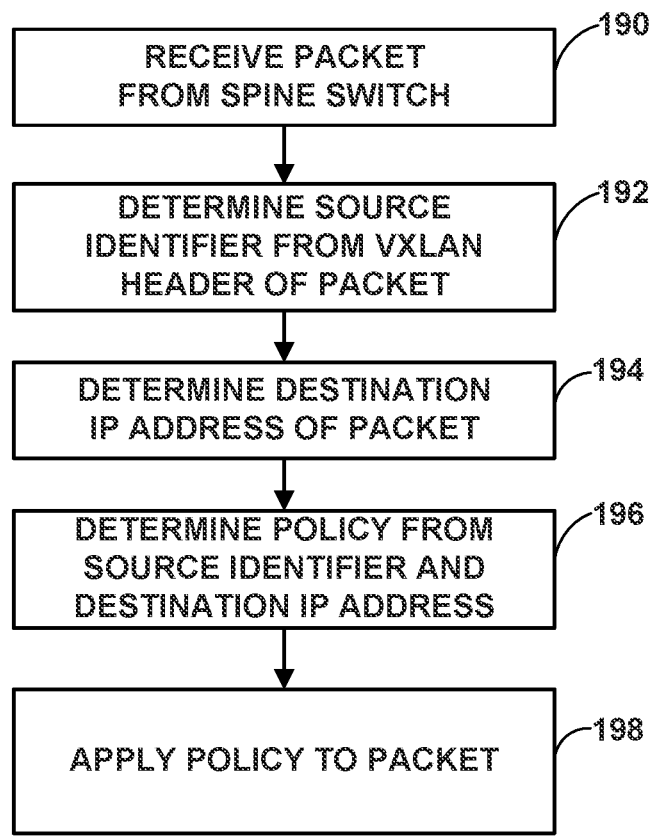
FIG. 7 is a flowchart illustrating an example method of applying a policy to a packet according to a source identifier and a destination address of a packet in accordance with the techniques of this disclosure.

FIG. 7 is a flowchart illustrating an example method of applying a policy to a packet according to a source identifier and a destination address of a packet in accordance with the techniques of this disclosure. The method of FIG. 7 may generally be performed by an egress leaf switch device, such as one of TOR switches 16 of FIGS. 1 and 2 or network switch device 100 of FIG. 4. The leaf switch device may act as an egress to a spine and leaf topology when receiving a packet from a spine switch of the spine and leaf topology, such as one of chassis switches 18. For purposes of example and explanation, the method of FIG. 7 is explained with respect to TOR switch 16Z of FIGS. 1 and 2. However, the same switch may act as both an ingress and an egress switch for different packets or packet flows. Thus, for example, TOR switch 16A or TOR switch 16Z may perform the methods of FIGS. 6 and 7 for different packets of different packet flows, depending on whether the packets are received from a device outside of the spine and leaf topology or from a spine switch of the spine and leaf topology.

In this example, TOR switch 16Z receives a packet from one of chassis switches 18 (i.e., a spine switch) (190). TOR switch 16Z may then determine a source identifier (source tag) from a VXLAN header of the packet (192). For example, TOR switch 16Z may parse data of the VXLAN header as shown in FIGS. 5B and 5C to extract the source identifier from the VXLAN header. TOR switch 16Z may also determine a destination IP address of the packet (194), e.g., from an outer IPv4 header of the packet.

TOR switch 16Z may then determine a policy from the source identifier and the destination IP address (196). For example, TOR switch 16Z may determine one of ACLs 50 using the source identifier and the destination IP address as shown in FIG. 2 or policies 114 as shown in FIG. 4. As noted above, policies 114 (or ACLs 50) may be stored in TCAM memory. By storing the policies or ACLs associated with destination IP addresses and source identifiers, instead of source ports, the amount of TCAM memory consumed by the policies/ACLs may be significantly reduced. TOR switch 16Z may then apply the determined policy to the packet (198).

In this manner, the method of FIG. 7 represents an example of a method including receiving, by a leaf switch of a plurality of switches arranged according to a spine and leaf topology, a packet from a spine switch of the plurality of switches, the packet being encapsulated with a Virtual Extensible Local Area Network (VXLAN) header; extracting, by the leaf switch, a source identifier value from the VXLAN header; determining, by the leaf switch, a destination address for the packet; determining, by the leaf switch, a policy to apply to the packet according to the source identifier value and the destination address; and applying, by the leaf switch, the policy to the packet.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by a leaf switch of a plurality of switches arranged according to a spine and leaf topology, a first packet from a first spine switch of the plurality of switches, the first packet being encapsulated with a first Virtual Extensible Local Area Network (VXLAN) header;
extracting, by the leaf switch, a first source identifier value from the first VXLAN header, the first source identifier value representing a first category for a first application that generated the first packet;
determining, by the leaf switch, a destination address for the first packet;
receiving, by the leaf switch, one or more border gateway protocol (BGP) messages specifying a plurality of policies, each of the plurality of policies being associated with a respective source identifier value and a respective destination address;
determining, by the leaf switch, a policy of the plurality of policies to apply to the first packet according to the first source identifier value and the destination address;
applying, by the leaf switch, the policy to the first packet;
receiving, by the leaf switch, data mapping a plurality of hardware source ports to a second source identifier value from a controller device for the plurality of switches;
receiving, by the leaf switch, a second packet from a network device separate from the plurality of switches, the second packet being different than the first packet;
determining, by the leaf switch, a hardware source port of the leaf switch by which the second packet was received;
using, by the leaf switch, the data mapping the plurality of source ports to the second source identifier value to determine that the source port is mapped to the second source identifier value;
adding, by the leaf switch, the second source identifier value to a second VXLAN header for the second packet; and
forwarding, by the leaf switch, the second packet including the second source identifier value to a second spine switch of the plurality of switches.

2. The method of claim 1, further comprising storing, by the leaf switch, the plurality of policies in ternary content-addressable memory (TCAM) of the leaf switch.

3. The method of claim 1, wherein receiving the one or more BGP messages specifying the plurality of polices comprises receiving the one or more BGP messages from the controller device for the plurality of switches.

4. The method of claim 1, wherein extracting the first source identifier value from the first VXLAN header comprises:
parsing eight flag bits of the first VXLAN header;
extracting the first source identifier value from bits of the first VXLAN header following the eight flag bits; and
parsing a VXLAN Network Identifier (VNI) value from bits of the first VXLAN header following the first source identifier value.

5. The method of claim 1, wherein extracting the first source identifier value from the first VXLAN header comprises:
parsing eight flag bits of the first VXLAN header;
parsing reserved bits of the first VXLAN header following the eight flag bits;
parsing a VXLAN Network Identifier (VNI) value from bits of the first VXLAN header following the reserved bits; and
extracting the first source identifier value from bits of the first VXLAN header following the VNI value.

6. A leaf switch device of a plurality of switches arranged according to a spine and leaf topology, the leaf switch device comprising:
a memory configured to store a plurality of policies, each of the plurality of policies being associated with a respective source identifier value and a respective destination address;
one or more network interfaces communicatively coupled to a first spine switch and a second spine switch of the plurality of switches; and
a processing system implemented in circuitry and configured to:
receive a first packet from the first spine switch via the network interfaces, the first packet being encapsulated with a first Virtual Extensible Local Area Network (VXLAN) header;
extract a first source identifier value from the first VXLAN header, the first source identifier value representing a category for an application that generated the first packet;
determine a destination address for the first packet;
receive one or more border gateway protocol (BGP) messages specifying the plurality of policies;
determine a policy of the plurality of policies to apply to the packet according to the first source identifier value and the destination address;
apply the policy to the first packet;
receive data mapping a plurality of source ports to a second source identifier value from a controller device for the plurality of switches;
receive a second packet from a network device separate from the plurality of switches, the second packet being different than the first packet;
determine a hardware source port of the leaf switch by which the second packet was received;
use the data mapping the plurality of source ports to the second source identifier value to determine that the source port is mapped to the second source identifier value;
add the second source identifier value to a second VXLAN header for the second packet; and
forward the second packet including the second source identifier value to the second spine switch of the plurality of switches.

7. The leaf switch device of claim 6, wherein the memory comprises ternary content-addressable memory (TCAM).

8. The leaf switch device of claim 6, wherein the processing system is configured to receive the one or more BGP messages specifying the plurality of policies from the controller device for the plurality of switches.

9. The leaf switch device of claim 6, wherein to extract the source identifier value from the first VXLAN header, the processing system is configured to:

parse eight flag bits of the first VXLAN header;
extract the source identifier value from bits of the first VXLAN header following the eight flag bits; and
parse a VXLAN Network Identifier (VNI) value from bits of the first VXLAN header following the first source identifier value.

10. The leaf switch device of claim 6, wherein to extract the first source identifier value from the first VXLAN header, the processing system is configured to:
parse eight flag bits of the first VXLAN header;
parse reserved bits of the first VXLAN header following the eight flag bits;
parse a VXLAN Network Identifier (VNI) value from bits of the first VXLAN header following the reserved bits; and
extract the first source identifier value from bits of the first VXLAN header following the VNI value.

11. A non-transitory computer-readable storage medium comprising instructions that, when executed, cause a processor of a leaf switch device of a plurality of switches arranged according to a spine and leaf topology to:
receive a first packet from a first spine switch of the plurality of switches, the first packet being encapsulated with a first Virtual Extensible Local Area Network (VXLAN) header;
extract a first source identifier value from the first VXLAN header, the first source identifier value representing a category for an application that generated the first packet;
determine a destination address for the first packet;
receive one or more border gateway protocol (BGP) messages specifying a plurality of policies, each of the plurality of policies being associated with a respective source identifier value and a respective destination address;
determine a policy of the plurality of policies to apply to the first packet according to the first source identifier value and the destination address;
apply the policy to the first packet;
receive data mapping a plurality of source ports to a second source identifier value from a controller device for the plurality of switches;
receive a second packet from a network device separate from the plurality of switches, the second packet being different than the first packet;
determine a hardware source port of the leaf switch by which the second packet was receive;
use the data mapping the plurality of source ports to the second source identifier value to determine that the source port is mapped to the second source identifier value;
add the second source identifier value to a second VXLAN header for the second packet; and
forward the second packet including the second source identifier value to the second spine switch of the plurality of switches.

12. The non-transitory computer-readable storage medium of claim 11, further comprising instructions that cause the processor to store the plurality of policies in ternary content-addressable memory (TCAM) of the leaf switch device.

13. The non-transitory computer-readable storage medium of claim 11, wherein the instructions that cause the processor to receive the one or more BGP messages specifying the plurality of policies comprise instructions that cause the processor to receive the one or more BGP messages from the controller device for the plurality of switches.

14. The non-transitory computer-readable storage medium of claim 11, wherein the instructions that cause the processor to extract the first source identifier value from the first VXLAN header comprise instructions that cause the processor to:
parse eight flag bits of the first VXLAN header;
extract the first source identifier value from bits of the first VXLAN header following the eight flag bits; and
parse a VXLAN Network Identifier (VNI) value from bits of the first VXLAN header following the first source identifier value.

15. The non-transitory computer-readable storage medium of claim 11, wherein the instructions that cause the processor to extract the first source identifier value from the first VXLAN header comprise instructions that cause the processor to:
parse eight flag bits of the first VXLAN header;
parse reserved bits of the first VXLAN header following the eight flag bits;
parse a VXLAN Network Identifier (VNI) value from bits of the first VXLAN header following the reserved bits; and
extract the source identifier value from bits of the first VXLAN header following the VNI value.

* * * * *